(12) United States Patent
Usher et al.

(10) Patent No.: US 6,703,499 B1
(45) Date of Patent: *Mar. 9, 2004

(54) PROCESS OF MAKING CARBOXYLATED DEXTRAN

(75) Inventors: Thomas C. Usher, Point Roberts, WA (US); Simon H. Wallis, Nakusp (CA)

(73) Assignee: Polydex Pharmaceuticals Ltd., Nassau (BH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 436 days.

(21) Appl. No.: 09/301,949

(22) Filed: Apr. 29, 1999

(51) Int. Cl.[7] ................................................ C08B 37/02
(52) U.S. Cl. ........................................ 536/113; 536/112
(58) Field of Search ................................ 536/113, 112; 424/180

(56) References Cited

U.S. PATENT DOCUMENTS

| | | | |
|---|---|---|---|
| 2,807,610 A | 9/1957 | Zief | 260/209 |
| 3,022,221 A | 2/1962 | Floramo | 167/68 |
| 3,234,209 A | 2/1966 | Floramo | 260/209 |
| 3,536,696 A | * 10/1970 | Alsop et al. | 260/209 |
| 4,180,567 A | * 12/1979 | Herb et al. | 424/180 |
| 4,370,476 A | * 1/1983 | Usher et al. | 536/113 |
| 4,788,281 A | 11/1988 | Tosoni | 536/113 |
| 5,635,611 A | 6/1997 | Ishiguro et al. | 536/4.1 |

OTHER PUBLICATIONS

Callant, D. et al. "A New Approach to Dextran Derivatives with Pendent Aldehyde Groups" *Reactive Polymers*, 8 (1988) 129–136, Elsevier Science Publishers B.V., Amsterdam.

J. American Chemical Society, 74, pp. 2126–2127 (1952).

* cited by examiner

*Primary Examiner*—James O. Wilson
*Assistant Examiner*—Howard Owens
(74) *Attorney, Agent, or Firm*—Debra Z. Anderson; Arnold B. Silverman; Eckert Seamans Cherin & Melott, LLC

(57) ABSTRACT

The present invention provides a process of preparing a novel carboxylic acid derivative of dextran. In particular, in the present invention, carboxylated dextran containing at least one carboxylic acid is reduced to remove all or substantially all reducing groups.

22 Claims, No Drawings

PROCESS OF MAKING CARBOXYLATED DEXTRAN

FIELD OF INVENTION

This invention relates to a novel process of making carboxylated dextran and to improved carboxylated dextran made by the process of the present invention.

BACKGROUND OF THE INVENTION

Iron dextran complexes have been widely used as injectable iron preparations for the prevention or treatment of iron deficiency anemias in animals and humans.

Dextran is a glucose polymer in which glucopyranose units are linked predominantly by alpha-1,6 linkage and to a lesser extent by alpha-1,2, alpha-1,3 and alpha-1,4 linkages. Crude, high molecular weight dextran is commercially obtained by growing *Leuconostoc mesenteroides* on sucrose substrate by methods known in the art. Dextran thus obtained is hydrolyzed and fractionated to yield low molecular weight dextrans.

It is known that effective complexation with iron is facilitated by introduction of carboxyl groups into the dextran molecule. Methods of preparing iron dextran complexes using carboxylated dextran are known.

For example, U.S. Pat. No. 3,536,696 to Alsop and Bremner describes a process for the preparation of a ferric hydroxide complex by reacting a suspension of ferric hydroxide with dextran heptonic acid formed by introducing a carboxylic acid group into the terminal unit of the dextran polymer molecule.

U.S. Pat. No. 4,370,476 to Usher et al describes the preparation of iron dextran complex by reacting a polycarboxylic acid dextran with ferric hydroxide to obtain a complex with comparatively high iron content. The polycarboxylic acid dextran is formed by first introducing into the dextran molecule, by a specific mild oxidation, a plurality of aldehyde groups which are subsequently converted to carboxylic acid groups by i) further oxidation of the aldehydes using stronger oxidizing agents or ii) cyanidation to produce the cyanohydrin derivative, followed by hydrolysis to produce the corresponding carboxylic acid.

U.S. Pat. No. 4,788,281 discloses that low molecular weight dextran (2000 to 6000) can be oxidized with sodium chlorite to produce a dextran hexonic acid derivative which will form a complex with ferric hydroxide having an iron content of up to 20% or more.

Although high iron content is possible in iron dextran complexes prepared using carboxylated dextran, one disadvantage is that patients receiving such preparations must be carefully monitored for shock and other clinical side effects. Moreover, in the case of iron complexes prepared using polycarboxylated dextran, the complexes are not completely stable at high temperatures such that autoclaving cannot be used to achieve terminal sterility.

SUMMARY OF THE INVENTION

It has now been discovered that the physicochemical stability and safety of iron dextran preparations made with carboxylated dextran can be improved if carboxylated dextran is reduced to remove all or substantially all reducing groups from the dextran prior to its complexing with iron.

In one aspect, this invention therefore relates to a novel process of preparing a carboxylic acid derivative of dextran comprising reducing a carboxylated dextran containing at least one carboxylic acid to remove all or substantially all reducing groups. The invention also relates to novel carboxylated dextran of the present invention which is non-reducing or substantially non-reducing and to metal complexes formed with the novel carboxylated dextran, including iron complexes.

DETAILED DESCRIPTION OF PREFERRED EMBODIMENTS

In one embodiment, carboxylated dextran is reduced by hydrogenation to convert all or substantially all reducing groups to alcohol groups while leaving the carboxylated groups unaffected for complexing. Suitable methods of hydrogenating dextran by catalytic, electrolytic or chemical hydrogenation are described in U.S. Pat. No. 2,807,610 to Zief. Carboxylated dextran may be hydrogenated under similar conditions.

Most preferably, hydrogenation is effected by reacting carboxylated dextran with about 1 to 2% sodium borohydride in basic aqueous solution (pH 7.5 to 10.0), atmospheric pressure and ambient temperature. The concentration of sodium borohydride should be kept as low as possible to facilitate removal of residual borate ions after hydrogenation. Preferably, the minimum concentration of sodium borohydride sufficient to obtain carboxylated dextran which is non-reducing or substantially non-reducing is used.

Hydrogenation may also be effected by catalytic hydrogenation at 25° to 60° C. and 1 to 5 atmospheres pressure using hydrogen gas, platinum under acidic conditions, rhodium in neutral or basic conditions, aqueous ruthenium in neutral or basic conditions. It may also be effected using Raney nickel, for example W6 and W7 type, under basic conditions, ambient temperature and atmospheric pressure. Catalytic hydrogenation using ruthenium is preferred since the reaction preferentially occurs in aqueous solvent.

The reduction should be sufficiently mild that carboxyl groups are not reduced. Since sodium borohydride is a comparatively mild reducing agent, the carboxylic acid groups on the dextran molecules will not be reduced. Moreover, carboxylic acids are one of the most difficult of all functional groups to hydrogenate and virtually all other susceptible functionalities should be hydrogenated in preference to them. Accordingly, under most conditions, hydrogenation of carboxylated dextran will not result in conversion of the carboxylic acid groups which are required for complexing.

Other suitable methods of reduction will be apparent to one skilled in the art who will know to avoid conditions which may also reduce carboxyl groups to alcohol groups.

The term carboxylated dextran as used herein refers to dextran containing at least one carboxylic acid group. Methods of preparing carboxylated dextran are described in U.S. Pat. Nos. 3,356,696, 4,370,476 and 4,788,281, the contents of which are hereby incorporated by reference.

A carboxylic acid group may be introduced into the terminal unit of dextran by hydrolysis of a cyanohydrin intermediate. The cyanohydrin intermediate can be obtained by reacting unhydrogenated dextran containing a terminal aldehyde group with an alkali metal cyanide such as NaCN or, preferably, KCN as follows. Although dextran of any molecular weight may be carboxylated, for use in injectable iron dextran complex, the terminally carboxylated dextran preferably has an average molecular weight (MW) of less than 70,000 and most preferably less than 5,000.

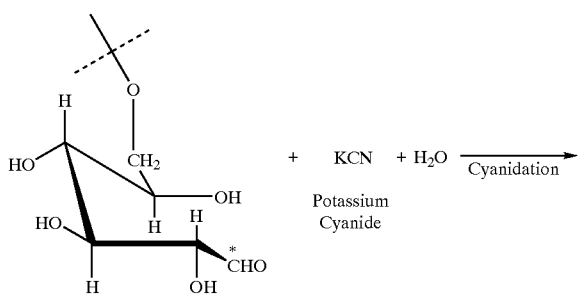

Potassium Cyanide

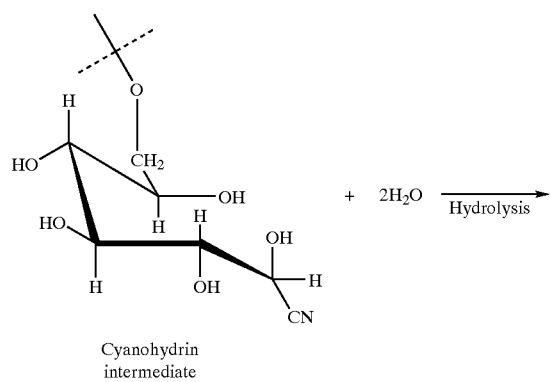

Cyanohydrin intermediate

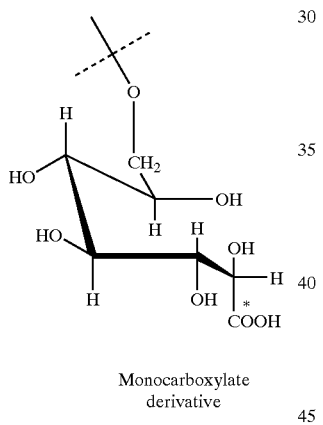

Monocarboxylate derivative

Dextran may also be oxidized with sodium chlorite in aqueous solution at a pH between 2.5 and 4.5 and at a temperature of about 20° to 30° C. to form dextran with terminal D-gluconic acid residues having the structure:

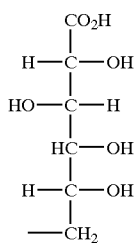

Particularly suited for this method is a low molecular weight dextran of average MW between about 2,000 to 6,000.

Polycarboxylated dextran may be formed as described in U.S. Pat. No. 4,370,476 by first introducing a plurality of aldehyde groups into the internal glucose units of dextran by specific mild oxidation using potassium periodate and then converting the aldehyde groups to carboxylic acid groups by further oxidation or by cyanidation and hydrolysis as follows. If the carboxylated dextran is to be used to complex iron, the average molecular weight of the dextran should be between about 1,000 and 9,000, and preferably between about 1,200 to 6,000 to produce suitable injectable products.

Introduction of Aldehyde Groups using Aqueous Periodate

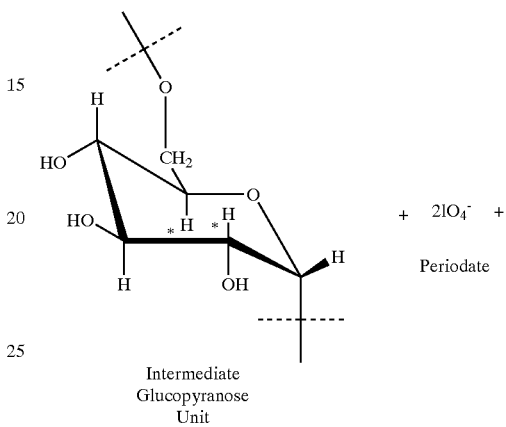

Intermediate Glucopyranose Unit

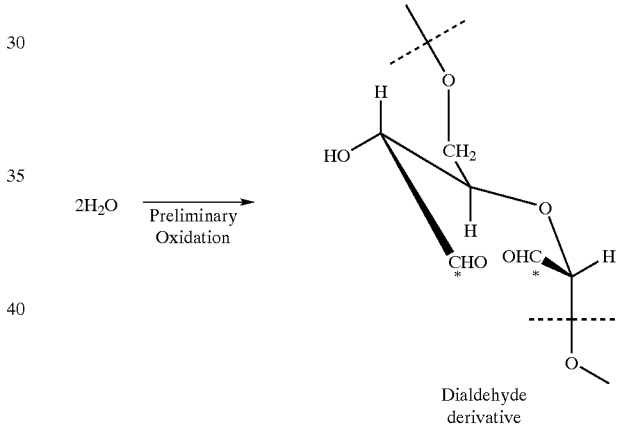

Dialdehyde derivative 1.2 Introduction of Carboxyl Groups

Using Bromine:

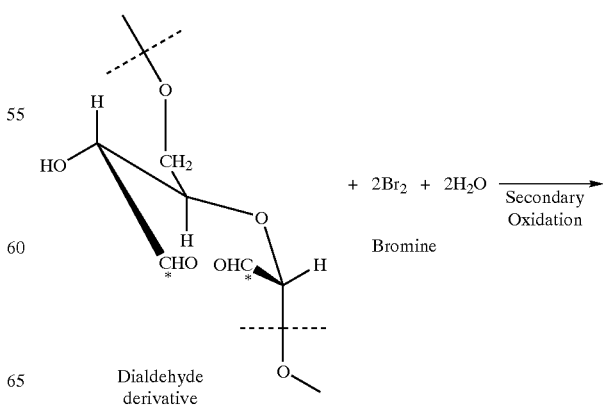

Dialdehyde derivative

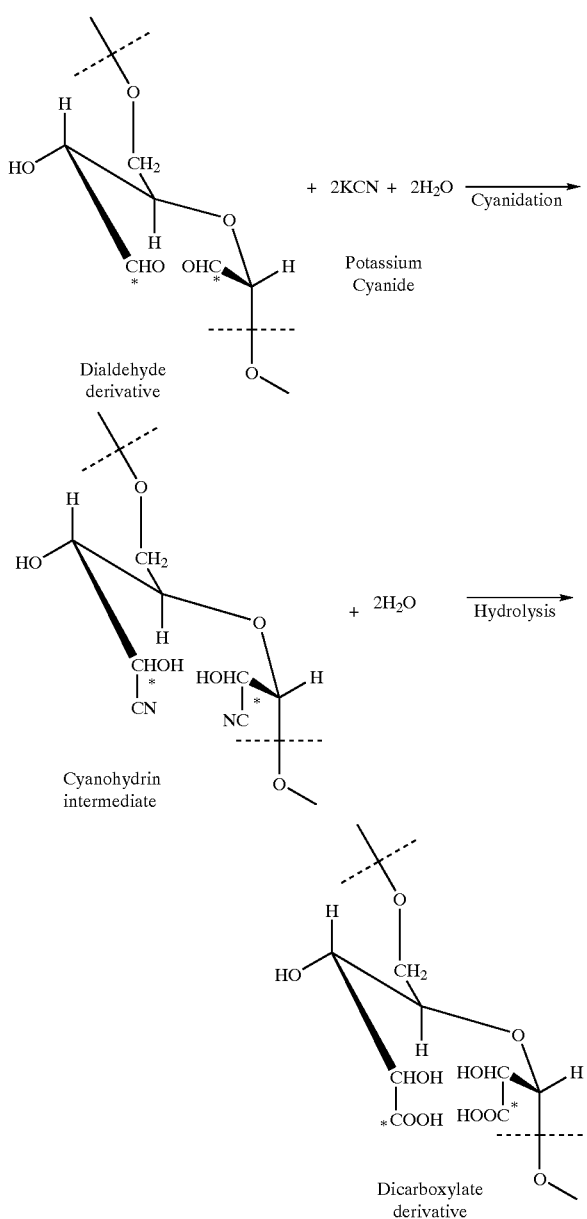

Dicarboxylate derivative

Using Potassium Cyanide:

Dialdehyde derivative + 2KCN + 2H₂O →(Cyanidation) Potassium Cyanide

Cyanohydrin intermediate + 2H₂O →(Hydrolysis)

Dicarboxylate derivative

After reduction of the carboxylated dextran according to the present invention, carboxylated and reduced dextran may be complexed with ferric hydroxide in the known manner to form iron dextran complex. Complex formation is believed to involve carboxyl functionalities and therefore polycarboxylated dextran is believed to be ideally suited for preparing iron dextran complex with a high iron content. Carboxylated and reduced dextran may also be employed to complex with suitable compounds of other metals such as copper or zinc hydroxide where the presence of carboxyl groups facilitates the complexation.

Use of hydrogenated dextran can lessen side reactions associated with injection of dextran. As described in U.S. Pat. No. 2,807,610 to Zief and in J. American Chemical Society, 74, pages 2126–2127 (1952); Zief, M. and Stevens, J. R., hydrogenation is believed to convert, for example, ketone groups and aldehyde groups (including aldehyde interminal positions) and those resulting from rearrangement of cyclic intermediates formed during the hydrolysis of the dextran to the corresponding alcohol group and thereby lessen the possibility of reaction with carbohydrates, proteins or other materials in the blood that may give rise to clinical side effects.

It is believed that during the various synthetic steps required to make carboxylated dextran, some degradation of dextran will occur. The degradation products are likely monosaccharides or other smaller oligomers each of which may contain terminal aldehyde groups. These products may undergo further rearrangement to form hydroxymethylfurfural (HMF) derivatives and other products containing ketone or aldehyde groups. HMF derivatives are very reactive and tend to self polymerise leading to the formation of coloured compounds. Moreover, in the case of polycarboxylated dextran prepared by first introducing a plurality of aldehyde groups into the dextran molecule, it is possible that conversion from aldehyde to carboxylic acid is not complete. For example, some aldehyde groups may be protected by steric hindrance caused by branched side chains, and aldehyde groups may remain in the polycarboxylated dextran. The presence of aldehyde groups is known to be associated with anaphylactic shock.

The chemistry of dextran is complex and reaction side products which may be formed during carboxylation of dextran have not been fully elucidated. However, as shown by a spectrophotometric Reducing Substances Test, described herein, carboxylated and reduced dextran according to the present invention is non-reducing. Reduction of carboxylated dextran is believed to provide carboxylated dextran with reduced side effects on administration and improved physical and chemical stability by eliminating reactive functionalities, examples of which are as follows:

Protected Intermediate Glucopyranose Dialdehyde Units

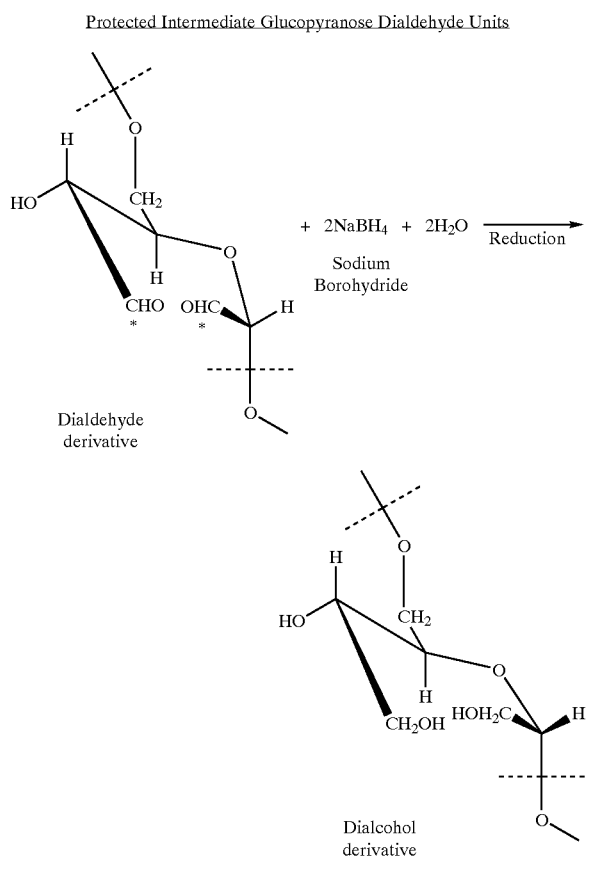

Dialdehyde derivative

Dialcohol derivative

General Reduction of Aldehydro-and Keto-Functionalities

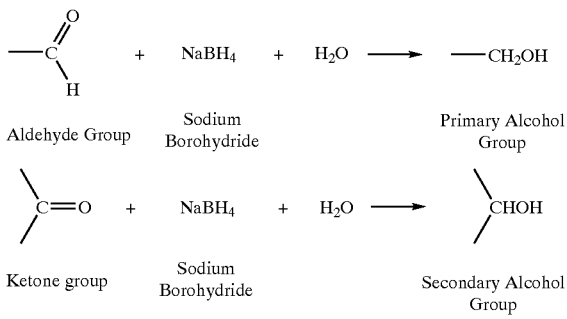

| Aldehyde Group | Sodium Borohydride | | | Primary Alcohol Group |

| Ketone group | Sodium Borohydride | | | Secondary Alcohol Group |

Reduction of Hydroxymethylfurfural Reaction By-Products

A typical example would be:

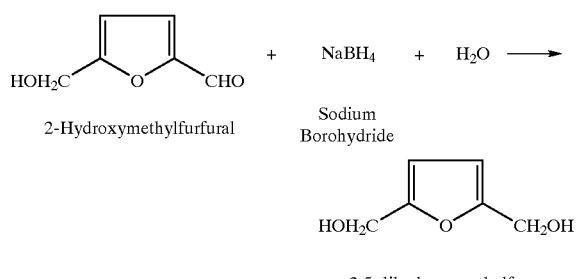

2-Hydroxymethylfurfural     Sodium Borohydride 2,5-dihydroxymethylfuran

EXAMPLE 1

Sodium Borohydride Treatment of Carboxylated Dextran

An aqueous solution of low molecular weight dextran (average MW 3,000) was oxidized by addition of 15% potassium cyanide and the terminally carboxylated dextran so formed was concentrated to a dextran concentration of 18.1% w/v. It had an intrinsic viscosity of 0.054, pH 5.0, conductivity 4500 micromhos. It was reducing to Reducing Substances Test (0.73 Absorbance Units (AU)).

1. 1% Borohydride Treatment

The pH of 100 mls of the carboxylated dextran solution, prepared as described above containing 18.1 grams of carboxylated dextran, was adjusted to 9.6 with sodium hydroxide. It took some time for the pH to stabilize, since after addition of a portion of the sodium hydroxide, the pH subsequently decreased, requiring further additions. 1% of sodium borohydride was added (0.18 grams of sodium borohydride based on the dextran concentration of the solution). The pH after addition was 9.5. The material was mixed with a magnetic stirrer at room temperature for 60 minutes and the measured pH was shown to be maintained at 9.5. The solution pH was then adjusted to 5.7–5.8 with 10% aqueous hydrochloric acid.

The resulting solution had a conductivity of 8,000 micromhos and was non-reducing to Reducing Substances Test (less than 0.000 AU). 2. 2% Borohydride Treatment The pH of 100 mls of the carboxylated dextran solution, prepared as described above containing 18.1 grams of carboxylated dextran, was adjusted to 9.6 with sodium 20 hydroxide. It took some time for the pH to stabilize, since after addition of a portion of the sodium hydroxide, the pH subsequently decreased, requiring further additions. 2% of sodium borohydride was added (0.36 grams of sodium borohydride based on the dextran concentration of the solution). The pH after addition was 9.5. The material was mixed with a magnetic stirrer at room temperature for 60 minutes and the measured pH was shown to be maintained at 9.5. The solution pH was then adjusted to 5.7–5.8 with 10% aqueous hydrochloric acid.

The resulting solution had a conductivity of 9,700 micromhos and was non-reducing (less than 0.000 AU).

3. 3% Borohydride Treatment

The pH of 100 mls of the carboxylated dextran solution, prepared as described above containing 18.1 grams of carboxylated dextran, was adjusted to 9.6 with sodium hydroxide. It took some time for the pH to stabilize, since after addition of a portion of the sodium hydroxide, the pH subsequently decreased, requiring further additions. 3% of sodium borohydride was added (0.54 grams of sodium borohydride based on the dextran concentration of the solution). The pH after addition was 9.5.The material was mixed with a magnetic stirrer at room temperature for 60 minutes and the measured pH was shown to be maintained at 9.5.The solution pH was then adjusted to 5.7–5.8 with 10% aqueous hydrochloric acid.

The resulting solution had a conductivity 11,600 micromhos and was non-reducing (less than 0.000 AU).

Reducing Substances Test

In all cases, the Reducing Substances Test was conducted as follows:

Preparation of Color Reagent

Moisten 5 grams of 3,5 dinitro salicylic acid with 25.3 mls of deionized water. Warm it slightly to dissolve. Then add 100 mls of 2N NaOH and dilute to 250 ml. Add 150 grams of sodium potassium tartrate and dilute to 500 ml. Filter if necessary.

Testing Procedure

Take 3 mls of a 1% sample solution and add 3 mls of Color Reagent as "Sample Tube". Take 3 mls of deionized water and add 3 mls of Color Reagent as "Control" and place both in boiling water for 5 minutes. Read the absorbance at 540 nm and note the result (Absorbance Units, or AU).

EXAMPLE 2

Low molecular weight terminally carboxylated and reduced dextran prepared as described in Example 1 may be complexed with iron as follows:

1,170 L of terminally carboxylated dextran of 22.97% w/v dextran content and a conductivity of 4,100 micromhos is placed into a suitable jacketed reactor. 3,400 L of ferric hydroxide solution, containing 7.93% w/v iron, of pH 2.82 and conductivity 4,200 micromhos, is added to the dextran solution and mixed well. With continued mixing, the pH of the reactants is adjusted to 8.6 using 10% w/v NaOH and the temperature of the reactor contents is raised to to 85–90° C. This temperature is maintained until the mixture has been concentrated to an iron content of 18.0–22.0% w/v.

The product is cooled to approximately 50° C. and iron dextran complex precipitated out by adding an equal volume of isopropyl alcohol and mixing for 15 minutes. The supernatant is pumped off and the precipitate dissolved in deionised water, to give an iron concentration of 10.0–16.0% w/v and a pH of 6.3. The solution is heated to 85–90° C. and product concentrated to give an iron content of approximately 24% w/v. Free iron is less than 0.2% w/v (normalised to 20.0% w/v iron content).

On cooling to ambient temperature, the pH is adjusted to 5.5–6.5 using 10% w/v NaOH. Chloride, phenol and iron concentrations are adjusted to 0.8–1.1% w/v, 0.45–0.55% w/v and 20.3–20.8% w/v, using NaCl, phenol and deionised water respectively. Product is filtered, using a suitable frame press equipped with NA-130 filter pads and the pads are flushed with approximately 100 L deionised water, which is added to the previously-filtered solution. The filtered solution is mixed and adjustments made to give approximately 1,300 L of product, having a pH of 5.5–6.5, chloride content 0.8–1.1% w/v, phenol content of 0.45–0.55% w/v and iron content of 19.0–21.0% w/v. Product is then passed through a 0.45 micron membrane filter cartridge and packaged into suitable bulk containers.

EXAMPLE 3

200 g low molecular weight dextran (average MW 4,500) having an intrinsic viscosity of 0.06 is dissolved in distilled water to 1200 ml. Add 22 g of potassium periodate into the solution. Maintain pH at 4.5 with 10% NaOH at 25° C. Oxidation takes place for 2 hours to produce polyaldehyde dextran.

To the above mixture 10% NaOH is added to raise the pH to 7.0 then 30 g of potassium cyanide is added. Warm the mixture to 40° C. and maintain for 15 hours. The temperature is raised to 95° C. while air is blown into mixture for 30 minutes to remove $NH_3$ gas. Cool the mixture to room temperature and deionize by passage through a mixed bed ion exchange resin e.g. a combination of Amberlite IR-120 Plus and Amberlite IRA 410 C1.

Take the resultant mixture and adjust the pH to 9.5–9.6 using 10% NaOH. Add 4 g of sodium borohydride and stir for 1–2 hours at ambient temperature. Adjust the pH to 5.7–5.8 using 10% HCl and pass the mixture through a suitable serial series of ion exchange resins e.g. Amberlite IRA-743, followed by a mixture of Amberlite IRA-120 Plus and Amberlite IRA 410 C1, to adsorb borate and other unwanted ionic species. Determine conductivity and reaction in Reducing Substances Test.

To 1000 ml of above solution, with pH adjusted to 6.0 with 10% NaOH, add 1000 ml of purified ferric hydroxide colloidal solution containing 8.33% elementary iron with 0.75% chloride ion, a conductivity of 2400 micromhos and a pH of 3.4. Adjust pH to 8.5 and heat to evaporate by gentle boiling until iron content is 10.5%. It is then precipitated with an equal volume of isopropyl alcohol, the precipitate is redissolved in water to give an elementary iron content of 8% and reconcentrated with gentle boiling until the elementary iron contents reaches to 10.5%. Filter through a sterile filter pad followed by aseptic filtration through a sterile 0.22 micron membrane filter. The complex is then aseptically filtered into suitable containers, e.g. vials, stoppered, sealed and autoclaved at 121° C. for 30 minutes.

One skilled in the art can readily appreciate that various modifications can be made to the described embodiments without departing from the scope and spirit of the invention. Such modifications are also intended to be within the scope of the invention.

We claim:

1. A process of preparing a reduced carboxylated dextran comprising reducing a carboxylated dextran containing at least one carboxylic acid to remove all or substantially all reducing groups.

2. The process of claim 1 wherein said carboxylated dextran containing at least one carboxylic acid is reacted with sodium borohydride.

3. The process of claim 2 wherein the carboxylated dextran is reacted with about 1 to 2% sodium borohydride in basic aqueous solution.

4. The process of preparing a carboxylated dextran comprising the steps of oxidizing dextran using sodium or potassium periodate to form dextran polyaldehyde, reacting the polyaldehyde with sodium or potassium cyanide to form dextran cyanohydrin and hydrolyzing the cyanohydrin to form a polycarboxylated dextran, and reacting said polycarboxylated dextran with sodium borohydride.

5. The process of claim 4 wherein said polycarboxylated dextran is reacted with about 1 to 2% sodium borohydride in basic aqueous solution.

6. Carboxylated dextran which is non-reducing or substantially non-reducing.

7. Carboxylated dextran of claim 6 which has an absorbance of less than 0.1 AU in the Reducing Substances Test.

8. A complex or iron with carboxylated dextran of claim 6.

9. The complex of claim 8 wherein the iron is ferric hydroxide.

10. A process of preparing iron dextran complex comprising reacting ferric hydroxide with carboxylated dextran of claim 6.

11. Carboxylated dextran of claim 6 wherein said dextran is polycarboxylated.

12. Carboxylated dextran of claim 11 which has an absorbance of less than 0.1 AU in the Reducing Substances Test.

13. A complex of iron with carboxylated dextran of claim 11.

14. The complex of claim 13 wherein the iron is ferric hydroxide.

15. A process of preparing iron dexlran complex comprising reacting ferric hydroxide with carboxylated dextran of claim 11.

16. The process of claim 1 wherein said carboxylated dextran containing at least one carboxylic acid is polycarboxylated dextran.

17. Carboxylated dextran prepared according to the process of claim 1.

18. Carboxylated dextran prepared according to the process of claim 2.

19. Carboxylated dextran prepared according to the process of claim 3.

20. Carboxylated dextran prepared according to the process of claim 4.

21. Carboxylated dextran prepared according to the process of claim 16.

22. Carboxylated dextan prepared according to the process of claim 5.

* * * * *

UNITED STATES PATENT AND TRADEMARK OFFICE
CERTIFICATE OF CORRECTION

PATENT NO.    : 6,703,499 B1
DATED         : March 9, 2004
INVENTOR(S)   : Thomas C. Usher and Simon H. Wallis It is certified that error appears in the above-identified patent and that said Letters Patent is hereby corrected as shown below:

Column 6,
Line 24, "interminal" should read -- in terminal --.

Column 8,
Line 28, "2. 2% Borohydride Treatment", should be heading for new paragraph.
Line 31, "sodium 20" should read -- sodium --.

Column 9,
Line 5, "Take 3 mis" should read -- Take 3mls --
Line 5, "add 3 mis" should read -- add 3 mls --.

Column 10,
Line 12, "3.4.Adjust" should read -- 3.4. Adjust --.
Line 31, after "reducing groups" insert -- while leaving carboxylic acid unaffected --.
Line 48, after "Carboxylated dextran" insert -- containing at least one carboxylic acid group wherein said carboxylated dextran -- and delete "which".
Line 50, after "Carboxylated dextran" insert -- containing at least one carboxylic acid group wherein said carboxylated dextran -- and delete "of claim 6 which".
Line 52, "or" should read -- of --.
Lines 53, 58 and 59, "6" should read -- 7 --.
Line 61-63, should be deleted in its entirety .
Line 66, "13" should read -- 12 --.

Column 10, line 6, through Column 12, line 8,
Claims 13, 14, 15, 16, 17, 18, 19, 20, 21 and 22 should be numbered 12, 13, 14, 15, 16, 17, 18, 19, 20 and 21, respectively.

UNITED STATES PATENT AND TRADEMARK OFFICE
CERTIFICATE OF CORRECTION

PATENT NO. : 6,703,499 B1
DATED : March 9, 2004
INVENTOR(S) : Thomas C. Usher and Simon H. Wallis It is certified that error appears in the above-identified patent and that said Letters Patent is hereby corrected as shown below:

Column 11,
Line 1, delete "dexlran" and insert -- dextran --.

Column 12,
Line 6, "16" should read -- 15 --.
Line 7, "dextan" should read -- dextran --.

Signed and Sealed this

Twenty-fourth Day of May, 2005

JON W. DUDAS
*Director of the United States Patent and Trademark Office*